T. TERREL.

Shovel Plow.

No. 54,623.

Patented May 8, 1866.

Witnesses:

Inventor:

UNITED STATES PATENT OFFICE.

TIMOTHY TERREL, OF SPRING HILLS, OHIO.

IMPROVEMENT IN SHOVEL-PLOWS.

Specification forming part of Letters Patent No. 54,623, dated May 8, 1866.

*To all whom it may concern:*

Be it known that I, TIMOTHY TERREL, of Spring Hills, Champaign county, State of Ohio, have invented a new and Improved Shovel-Plow; and I do hereby declare that the following is a full, clear, and exact description thereof, which will enable others skilled in the art to make and use the same, reference being had to the accompanying drawings, forming part of this specification, in which—

Figure 1:
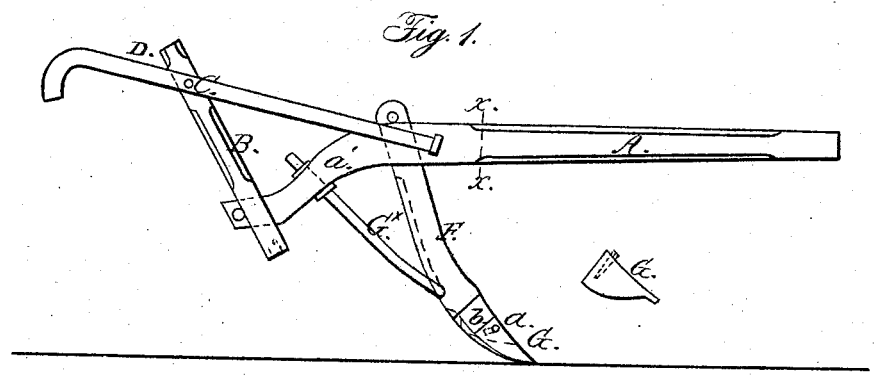
Figure 2:
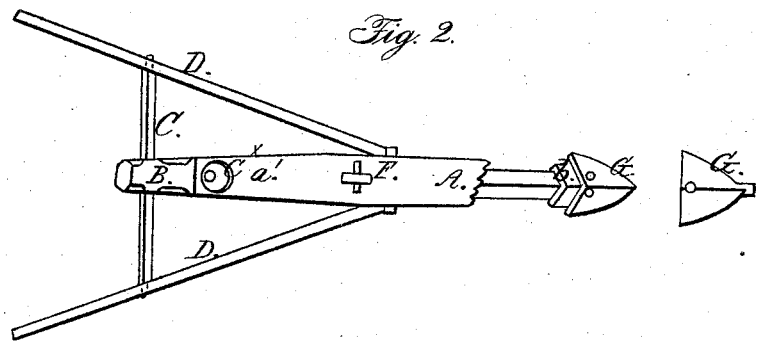

Figure 1 is a side view of my invention; Fig. 2, a plan or top view of the same, a portion of the beam being broken away, as indicated by the line $x\ x$, Fig. 1.

Similar letters of reference indicate like parts.

This invention relates to a new and improved shovel-plow; and it consists in a novel manner of constructing the same, as hereinafter fully shown and described, whereby the plow is rendered extremely strong and durable.

A represents the beam of the plow, which is constructed of wood, and is curved at its rear part, so as to project downward, as shown at $a'$, and has a bar, B, attached, inclining backward from a vertical line across rod C, extending through the upper part of B to connect the two handles D D, the lower ends of which are secured to the beam A.

F represents the standard, which is of cast-iron, and has its upper end passing through the beam. The lower end of this standard is cast with a double bevel, $b$, to correspond to the form of the share G, the latter being attached to the standard by a bolt, $a$, (one or more.) The standard F is braced from the beam A by means of a rod, $G^\times$, the lower end of the latter passing into the lower part of the standard just above the share, and the upper end of said brace passing through the beam near its rear end. This brace-rod, attached to the curved rear part of the beam, greatly strengthens the plow, effectually preventing it from breaking, and admitting of the plow being used in the hardest clayey soils without the least danger.

Different shares G may be applied to the standard to suit the character of the soil to be plowed and the nature of the work to be done. The shares are of shovel form, and may be of steel or wrought-iron.

Having thus described my invention, what I claim as new, and desire to secure by Letters Patent, is—

The curved rear part of the beam A, in combination with the brace $G^\times$ and standard F, the latter being of double-bevel form to receive the share, and all arranged substantially as and for the purpose herein set forth.

TIMOTHY TERREL.

Witnesses:
 E. T. DAVIS,
 GEORGE WILLIAMS.